Feb. 3, 1953     C. N. O'DAY     2,627,219

AIR EXHAUSTER

Filed Jan. 31, 1950

INVENTOR.
CORTLAND N. O'DAY

BY James C. Ledbetter

ATTORNEY.

Patented Feb. 3, 1953

2,627,219

UNITED STATES PATENT OFFICE 2,627,219

AIR EXHAUSTER

Cortland N. O'Day, Port Washington, N. Y., assignor to Air Devices, Inc., New York, N. Y., a corporation of New York Application January 31, 1950, Serial No. 141,494

5 Claims. (Cl. 98—82)

1

This invention relates to an air exhauster of new and useful form, and of the wind-stream pressure-actuated type operating on the venturi principle, for applying a suction force to and withdrawing vitiated static air from a building, room or other space requiring ventilation.

An air exhauster of this general class—improved in structure and function by virtue of the present invention—comprises a hooded aspirating device, with stationary parts, adapted to be installed on the roof of a building (or elsewhere in order to be exposed to kinetic air pressure such as a natural wind stream) and has air deflector vanes or baffle plates against the exterior of which the wind stream (primary air), by its velocity, directly impinges to induce a suction through the interior of the exhauster and hence outward through an air duct communicating with a space to be ventilated by evacuation of the vitiated static atmosphere (secondary air) therefrom.

A purpose of the invention is to provide a new air exhauster of simplified construction having increased efficiency, that is, for applying a maximum internal suction force on a ventilated space, from a given velocity and pressure of an external wind stream blowing against the exhauster from any direction, and at the same time preventing the entry of wind and rain.

*Illustration of structure, air flow and principles of the invention*

The accompanying drawings with description and claims explain the invention as preferred and embodied at this time for an understanding of the problems sought to be solved. Since the teachings herein may suggest structural changes to others who wish to avail themselves of the benefits of the invention, it is pointed out that subsequent modifications hereof may well be the same in spirit and principle as this disclosure.

Figure 1:
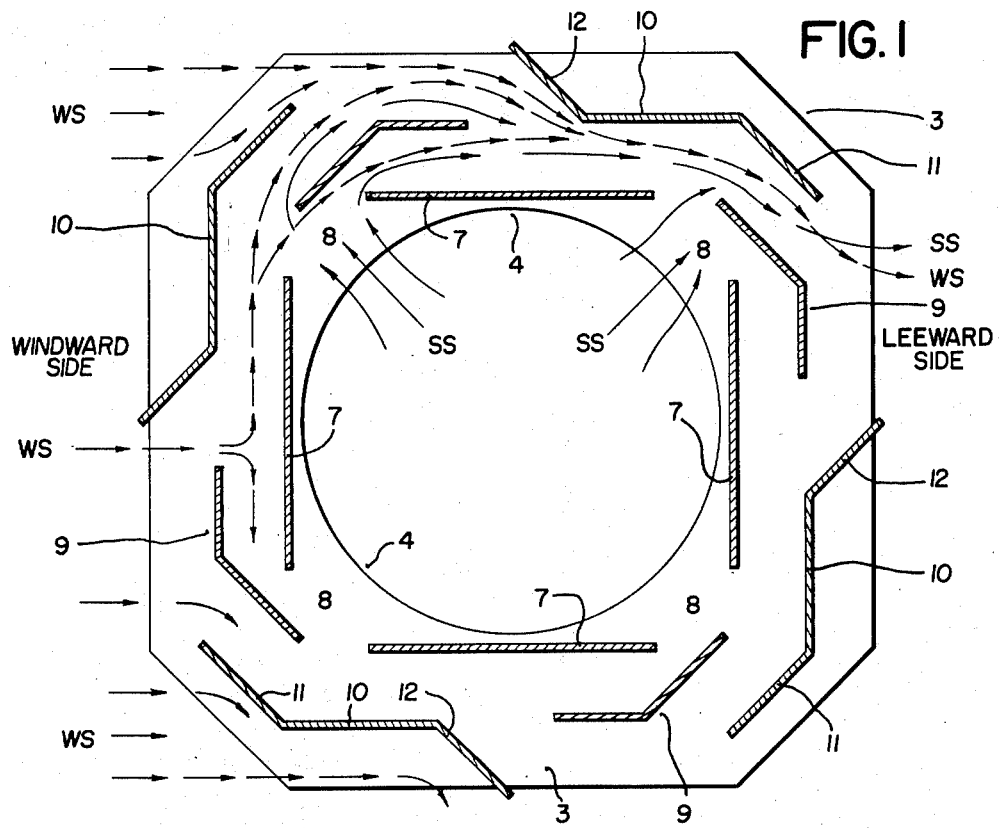

Fig. 1 shows a horizontal plan section (on the line numbered 1 in Fig. 2) of the air exhauster looking down on and in the plane of its upright stationary baffle plates. This view is diagrammatic and portrays the action of a primary wind stream blowing under positive pressure against the outer surfaces of the baffles in the exhauster, thus applying a suction on the static air interiorly thereof and hence producing a negative pressure on a ventilated space to more effectively evacuate it by the operation of this new exhauster.

Figure 2:
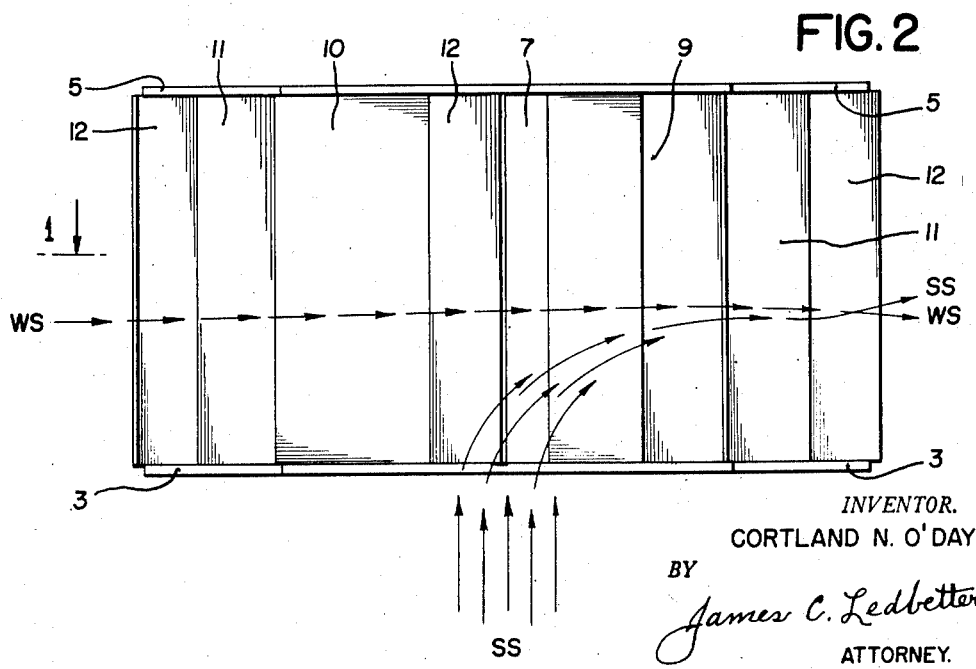

Fig. 2 is a side elevation of the air exhauster in its usual upright position but not shown in connection with a conventional suction duct leading to a ventilated space.

The drawings are made to scale from a small size commercial production specimen of the exhauster, as one preferred example of construction, and show the proportional sizes of the parts and their spaced relation to each other. Thus, the drawings may be availed of (as a part of this disclosure) for scaling the dimensions and hence proportions of the construction. This novel exhauster is manufactured and sold in select model numbers accommodating various sizes (volumetric capacity) of rooms or other enclosed spaces requiring ventilation.

The printed legends, as well as the two forms of direction arrows representing a wind stream and also a ventilating suction stream, aid in describing the mode of operation of the air exhauster.

*Simplicity of present example and preliminary description of mode of operation*

In general, the exhauster comprises—in one of its preferred forms of construction—a bottom or base having an interior suction opening, with a top or cover spaced above the base, together with a series of upright generally flat-area baffle plates which are fixed (welded) to and carried between the base and cover, as proportioned and arranged in the drawings, to provide the functional improvements achieved by this invention.

For the sake of clarity in illustration, the drawings have been simplified, in that not only the well known suction duct but also the fastening leg brackets (for securing the exhauster in service position on a roof or mounting it on the duct) have been omitted from the base of the exhauster. Likewise, the welding flanges on the bottom and top parallel edges of the baffles have been omitted. These parts are conventional, do not relate to the invention as such, and are purposely omitted. They comprise unrelated details of conventional construction.

Further reference is made to the drawings for a more detailed description of the illustrated example of the invention. It is seen that a base plate 3 of generally octagonal shape is provided with a central suction opening 4 which is usually circular (Fig. 1) and is adapted to be fitted over the upper or outer end of a static-air suction duct (not shown) extending in a known way from the exhauster to a ventilated space for evacuating stale air therefrom. The base 3 may be provided on its bottom surface with suitable fastening means such as brackets (not shown) for installing the exhauster in service position exposing it to prevailing winds from any direction.

An imperforate or solid cover plate 5 is mounted (Fig. 2) in spaced parallel relation above the base 3 and is the same size and shape as the base, both of which have their four corners cut away (relieved) which makes a modified octagonal shaped base and cover (bottom and top) of these otherwise square members. The base and cover may be flat as shown for the sake of simplicity in design and construction. The air exhauster is usually installed in upright position which disposes the base and cover parts horizontally and thus mounts its axis perpendicular to prevailing wind streams.

A series of inner, intermediate and outer groups of air deflector vanes or baffle plates of rectangular shape are fixedly mounted in and between the base 3 and cover 5 by welding or otherwise securing them in place in a manner known to the art. Each of the three groups comprises four baffles, hence twelve in the exhauster. All of the baffles have flat-area formations, but the "planes" of the "flats" vary in number and angular relation between the groups in a novel manner, and all baffles are the same height.

Then again, all four baffles of any one or a given group are identical in form and dimension, but the baffles of any given group structurally differ in a novel manner from those of the other two groups. As shown in the drawings, the four individual baffles of each group are fixed at right angles with each other, concentric with the suction opening 4 of the base, and present a geometrical pattern of overall symmetry. Consequently, the foregoing stated features in common apply to the description of each baffle group, as follows:

A first group of four overall flat (in one plane) plates 7 is fixed adjacent to and around the circular suction opening 4. Each baffle is flat in one plane and has a width less than the diameter of the suction opening 4. This group of four baffles 7 is arranged in a square pattern, and leaves rectangular shaped suction orifices 8, all of equal area, with one orifice at each of the four corners of the square (modified to an octagonal form), as illustrated. The static secondary air (note long-tail arrows SS) is exhausted outward, through the octagonal corner suction orifices 8, from the suction opening 4 and hence from a conventional suction duct adapted to be connected therewith when installed in communication with any space to be ventilated.

A second or intermediate group of four flat (in two planes) dihedrally shaped baffle plates 9 is disposed adjacent to and equidistantly spaced from the first baffle group 7. Each baffle 9 comprises a two-plane member, in overall width not greater than the radius of the suction opening 4, with its two wing portions directed inward of the exhauster. Thus, the vertical wing-defining mid-apex of each baffle 9 is set outward of the exhauster. One wing of each dihedral baffle partially overlaps or masks the adjacent suction orifice 8 but is spaced therefrom, that is, the overlapping portion of each baffle 9 has its vertical edge disposed about midway of and spaced from its adjacent suction orifice 8.

Finally, a third and outer group of four flat (in three planes) trihedrally shaped baffles 10 also is fixedly mounted in the position and spaced relation shown, each being wider than the baffles 7. Each three-plane baffle has a flat central wind-guiding area 10, also an inwardly directed wind deflecting flat wing 11, and an outwardly directed combination wind scoop and deflector flat wing 12.

Actually, each protruding wing portion 12 is an "air-pressure scoop" when pointed into the wind stream WS (as at the top side of Fig. 1) by which said stream strikes the inner surface of said wing, whereas it constitutes an "air-suction deflector" when pointed away from the wind stream (as at the bottom side of Fig. 1), thus serving to perform two functions, pressure and suction, depending upon its position in relation to the wind stream direction.

Note that the mid-portion 10 of the trihedron is disposed in the same plane as one of the wings of a baffle 9. The wind deflector scoops 12 protrude to or even reach beyond the longer of the marginal edges of the base and cover. The outer reach of the wind scoops 12 receives the wind stream (note short-tail arrows WS) blowing from any direction. The primary air stream WS enters the exhauster through upright inlet orifices defined by the adjacently spaced edges of the wind scoops 12 and baffle plates 9 and also through inlet orifices formed between the baffles 9 and wings 11.

It is now observed that each baffle 7 of the inner group is flat in "one plane", that each intermediate baffle 9 (dihedron) is flat in "two planes," and each outer baffle (trihedron) 10 is flat in "three planes." This linear geometrical pattern—counted in one, two, three angular planes from the inside out—distinguishes from many of the prior art exhausters embodying curvilinear baffles. Such new pattern includes a "flat," also a "dihedron," as well as a "trihedron," being a new combination found to produce an internal air suction stream (long-tail arrows SS) of augmented maximum volumetric flow derived from the energy of a given external wind stream (short-tail arrows WS) shown as a part of the legends on the drawings.

It is seen that the foregoing new combination of groups of flat-area baffles 7, 9 and 10, in their spaced and paralleling arrangement, defines a modified form of octagonal pattern and provides straight flow passages as well as angular passages at the four corners defining the suction orifices through which the static air is drawn in a suction stream SS.

In coming to a description of the operation, it is noted that Fig. 1 is adapted as a structural view as well as an action diagram. The "wind stream WS" and also the "suction stream SS" are shown on the upper portion of the diagram, this is in order that the lower portion of the view be left clear for placement of reference numbers pointing out the structural parts. One versed in the art will understand that the two streams of contrasting arrows (primary WS and secondary SS) are omitted for clarity from the lower portion of Fig. 1.

Since it is difficult to illustrate and describe invisible air flow, it is well for the reader to initially study the legends and the contrasting arrow streams on the drawings. It is seen that the "windward side" is West shown at the left and is set with the previously mentioned short arrows to represent a prevailing wind stream WS of average velocity striking the outside flat surfaces of the several sets of baffles in the path of the primary air acting positively. Then again, the long arrows represent the suction stream SS of maximum flow of secondary air under negative pressure moving upwardly through the suction opening 4 and outward at SS on the "leeward side" at the East on the right.

Studying the action further, it will be seen that the energy (velocity and volume) of the wind stream WS, received by the wind scoops 12, flows between the spaced baffle groups and past the suction orifices 8. The single-plane flat inner baffles 7 act as barriers against the entry of wind pressure into the interior suction opening 4, irrespective of wind direction.

The wind pressure and flow velocity set up a skin-frictional drag of air contiguous with the open area of all four of the rectangular suction orifices 8 and actuate or produce a frictional pull which applies a negative pressure on the static air within the suction opening 4 and also on a ventilating or suction duct connected therewith. Such action exerts a powerful pulling force on the vitiated static air within the exhauster and carries it out (along the path of the suction stream long arrows SS) and discharges it on the leeward side.

In following the foregoing flow pattern, it will be seen that the wind stream WS (primary air) and the suction stream SS (secondary vitiated air) join exteriorly adjacent all four of the orifices 8 to produce a merged wind stream discharged from the air exhauster on the leeward side. This action is illustrated as well as possible by paralleling the wind stream short arrows WS with the suction stream long arrows SS, beginning where the pressure and static streams join, along the general plane of all four suction orifices 8, in the enlarged flow passages traversing (passing by) said orifices, and then indicating the merged or mixed streams where the short and long arrows cross at the discharge (leeward side) of the exhauster.

A natural wind stream WS acting from any direction (such as the Westerly blow illustrated) induces suction actuated at all four of the orifices 8, thereby performing on the principle of a Venturi tube in evacuating static air upward through the suction duct opening 4 and thus producing a strong out-draft SS of air from a ventilated space. Inasmuch as the problems of aerodynamics, involving venturi or wind actuated exhausters, are approached for solution by me on a basis believed wholly different from conventional practice, there follows a more specific description of operating fundamentals not yet treated.

*My new principle and multi-side suction*

Further explanation is made of underlying concepts and features of the invention in order to more readily understand the distinctions over exhausters in the prior art.

It is seen that the reference characters 8 are placed coincident with the plane of each of the four suction orifices—thus locating them with exactness—and defining the four short sides of a generally octagonal shape. On the other hand, the four flat baffle plates 7 (placed in the form of a square) present the other and long sides of the octagon. Consequently, the planes of the suction orifices 8, in effect, truncate the corners of the square. Such truncated pattern effectively cooperates with the four corner wind deflecting wings 11, one paralleling the plane 8 of each suction orifice and, therefore, conforming to the short sides of the octagonal shape of the exhauster.

Emphasis is now placed upon the fact that the air-flow passage along each flat baffle 7 is narrower (more closely spaced relatively to the flat baffle portions 9 and 10) than the flow passage between each suction-orifice plane 8 and the baffle portion 11 paralleling it. In other words, the cross sectional area of the flow passage, along or by said plane 8, has a larger cross sectional area than that of the passage along the baffle 7. Observe, therefore, that the inlet orifice at each wind scoop 12 and its passage contiguously along the baffle 7 (in approaching the suction orifice 8) are restricted in admitting the wind stream WS but are enlarged substantially in cross sectional area at and along said orifice 8 where the suction stream SS enters and joins the wind stream WS.

The foregoing arrangement in no manner is altered by the intermediate guide baffles 9 which aid in masking the suction orifices 8 against entry of the weather and the wind stream WS. Significantly, the larger size flow passage, its greater cross sectional area—where it traverses the suction orifice 8—provides room (entry space) for reception of the suction stream SS. Without this increase in passage capacity—at and along the plane 8 of the suction orifice—there would be a lack of adequate room for the suction stream to join the wind stream, and the outstanding advantage of "multi-side suction," later explained, would not be accomplished.

Further understanding of my new principle in this art is gained by realizing that more air "goes out" from the leeward side than "comes in" through the windward side. This is readily seen—for the wind stream WS alone enters where it impinges the exhauster. On the other hand, the suction stream SS joins at the four octagonal corners 8 (the suction orifices) and, accordingly, both streams escape on the discharge side. My exhauster turns this condition to account and provides a geometrical pattern of baffles—symmetrical along all eight sides of the octagonal pattern—to apply air suction to four of the sides, to-wit, at the truncating suction orifices marked 8, 8, 8 and 8, as illustrated.

It is also a known condition that the suction stream SS is "static" and requires "energy" to overcome its inertia. One readily appreciates, therefore, why I have sought to devise a new pattern of baffle plates which operate to apply the suction energy circumferentially of the suction opening 4—likewise on a vertilating duct connected therewith—rather than on the leeward side only, as in conventional practice. Long ventilating ducts interpose resistance to air flow, due to skin-frictional drag of the air along the duct surface. Such resistance augments the "static" characteristic of the suction stream SS and, cumulatively, retards flow to such an extent that it limits the usefulness of conventional exhausters which "merely suck from the leeward side" and not elsewhere.

In contrast thereto, my exhauster not only generates a suction force from the low-pressure area "commonly existing on the leeward side of any physical obstruction in the path of a wind stream" but also presents an innovation in its departure from conventional practice by virtue also of generating an additional suction force on the "other three sides." Study of the foregoing description and the drawings will demonstrate why this unusual mode of "multi-side" operation is accomplished.

As to the latter feature, it is readily seen that the first two suction orifices 8—contiguous with the windward side—experience a pulling and suction force exerted thereon by the rush of the wind stream WS through the enlarged passages traversing them. And the same is likewise true of the other or second two suction orifices 8 on the leeward side, even more so with the latter—for they are under the influence of the low-pressure area commonly existing on the leeward side. Now it will be appreciated that my new exhauster harnesses the wind stream WS and compels it to perform double work—in that the stream generates suction as it enters the windward side and also as it discharges from the leeward side, both "coming and going."

Accordingly, it is appreciated that my exhauster provides an innovation in the art by utilizing the undiminished "broadside" striking force of the wind stream WS—at and against the windward side—for generating and exerting maximum suction on the first two suction orifices 8 and 8 traversed. By this is meant that the wind pressure is not dissipated by frictional drag through the exhauster to generate thereafter and apply its "first and only suction force" at and from the leeward side.

The latter deficiency and problem, among others, is solved by my discovery herein of ways and means to convert the undiminished initial energy of a wind stream into a suction force before losing a part of its said energy in threading and slicing its way through conventionally arranged baffles. Such structural and functional improvements are of marked advantage to the art.

Other advantages inherent and readily noted by those skilled in the art are omitted from this description, but in conclusion reference is made to the uniformity of axial up-draft flow. By exerting the suction force uniformly around the circumference of the suction opening 4 (see Fig. 1), it follows that the suction stream SS is more nearly free to flow up the center of a conventional duct connected with this exhauster.

One readily appreciates that the last-above stated function of this novel exhauster eliminates the sidewise pull of the suction stream—avoids dragging it along the leeward side of the duct and against the friction thus interposed—so characteristic of Venturi type exhausters now in use and habitually depending, for suction generation, upon the low pressure area on the leeward side.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

The invention is presented to fill a need for a new and useful air exhauster. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

1. An air exhauster including a base, which has a central suction opening adapted to connect with an air duct leading from a space to be ventilated, and a cover disposed above the base; upright supports mounted between the base and cover, comprising an inner-baffle means adjacent and around the suction opening, and having spaced adjacent edges, which form a suction orifice, and through which static air is adapted to be exhausted from the suction opening; an outer-baffle means, concentrically spaced from the inner-baffle means, which forms an air-flow passage between said two baffle means, and which passage extends past the suction orifice; the outer-baffle means having spaced adjacent edges, providing a wind-stream inlet into the passage; an intermediate-baffle means in the passage, between the inner and outer-baffle means, opposite the inlet, and extending part way across the suction orifice in spaced relation therefrom; and outlet means leading from the passage through the outer-baffle means; the inner and outer-baffle means being so spaced from each other that the portion of the passage, which is adjacent the suction orifice, and which leads toward the outlet means, is enlarged to provide a greater air-flow capacity than the inlet, and that portion of said passage, which is between the intermediate and outer-baffle means, is reduced to provide the same flow capacity as said inlet; whereby the inlet is adapted to admit a lesser volume of a wind stream than will fill the enlarged portion of the passage at the suction orifice, thus providing room or space for the entry of static air, induced to flow as a suction stream, through said suction orifice, from the central suction opening of the base, into said enlarged passage, thus joining the admitted lesser portion of the wind stream, and discharging therewith outwardly from the exhauster through the outlet means.

2. An air exhauster having a base provided with a suction opening, a cover spaced thereabove, and rectangular shaped baffles mounted in symmetrical relation between the base and cover, comprising, in combination; an inner group of four flat baffles, arranged in the form of a square, around the suction opening, and provided with a suction orifice between the adjacent edges of these flat baffles, hence four suction orifices, one at each corner of said square; an outer group of four baffles spaced from the inner group, each baffle of this outer group having a flat area and also having an inwardly directed wind deflecting flat wing which extends parallel to the plane of and opposite a corresponding suction orifice, said four flat areas paralleling the flat baffles of the inner group, and thus also arranged in the form of a square, whereby four flow passages are provided and are connected with each other, and also in communication with the aforesaid four suction orifices; an intermediate group of four baffles, each of which has two flat areas, one flat area of each baffle being parallel to and spaced from the adjacent flat baffle of the inner group, and providing an inlet orifice between it and said adjacent baffle of the outer group for admission of a wind stream, hence four inlet orifices; the cross sectional area of that portion of each flow passage, which is adjacent each suction orifice, being greater than that of each inlet orifice, whereby said inlet orifices admit a lesser volume of air from said wind stream than will fill the flow passages, thereby providing room for the entry of static air, induced to flow as a suction stream, from the suction opening, through all four of said suction orifices, into the flow passages, thus joining the admitted portion of the wind stream, and discharging therewith on the leeward side of the air exhauster.

3. An air exhauster, as covered in claim 2, and wherein the plane of each suction orifice truncates each corner of the square.

4. An air exhauster comprising, in combination, a base having a suction opening and a cover spaced thereabove; and rectangular shaped upright plates fixedly mounted, in symmetrical relation, between the base and cover; consisting of an inner first group of four overall flat baffles disposed in the form of a square, and being spaced apart at their adjacent upright edges, to provide a suction orifice at each of the four corners; also an intermediate second group of four dihedrally shaped baffles, being narrower in upright width than those of the first group, and being spaced apart at their adjacent upright edges, as well as spaced outward from said first group, with one flat wing of each dihedron paralleling an adjacent flat baffle of the first group, while the other wing of said dihedron parallels the plane of the open area of an adjacent suction orifice of the first group, to partially overlap said suction orifice but spaced therefrom; and an outer third group of four trihedrally shaped baffles, being wider in upright width than those of the other two groups, and being spaced apart at their adjacent edges, as well as spaced outward from said intermediate second group, with a central flat area of each trihedron paralleling the plane of an adjacent flat baffle of the first group, and said flat area being in a common plane with one wing of an adjacent baffle of the intermediate second group, one wing of each trihedron being directed inward and overlapping that portion of an adjacent suction orifice not overlapped by a baffle of the second group, and the other wing of each trihedron directed outward from the flat area beyond the said common plane to provide a combination wind scoop and deflector midway of each baffle of the inner group.

5. An air exhauster of the wind actuated type, including a horizontal base and a cover spaced thereabove; the base having a suction opening into which may be received a suction duct adapted to be connected with the exhauster, thereby placing it in communication with a space to be ventilated; three groups of upright baffle plates of rectangular shape mounted symmetrically with each other around the suction opening and secured in and between the base and cover; comprising a first group of four baffles proximate the suction opening in the form of a square, and having their adjacent upright edges spaced apart to provide a rectangularly shaped suction orifice at each corner of said square; also a second group of four dihedrally shaped baffles, having flat-area wings, set outward from the first group, with their apexes disposed outward, and their said wings disposed inward, one wing of each dihedron partially overlapping in spaced relation each aforesaid suction orifice; and a third group of four trihedrally shaped baffles arranged outward from the second group, one apex of each trihedron being disposed inward, the other apex outward, and each trihedron fully overlapping that portion of each suction orifice not overlapped by the second group of baffles; adjacent wings of the dihedron baffles and of the trihedron baffles being parallel with each other, also the central portions of said trihedron baffles being parallel with the planes of the flat baffles of the first group; each baffle in its group of four, and in the three groups specified, having straight upright edges spaced from each other, by which each group provides four rectangularly shaped orifices symmetrically arranged around the suction opening; whereby a wind stream entering the air exhauster through the orifices of the second and third group of baffles, on the windward side, is deflected around and past the orifices of the second and first group, and is discharged from the orifices on the leeward side of the exhauster, thereby producing a skin-frictional drag and applying a pulling effect on the static air at the inner orifices of the first group of flat baffles, thus drawing said static air from the suction opening of the base and discharging it outwardly through the orifices formed by the first group, into the space between the second and third group, and thence outward from the exhauster with the wind stream.

CORTLAND N. O'DAY.

REFERENCES CITED

The following references are of record in the file of this patent:

UNITED STATES PATENTS

| Number | Name | Date |
|---|---|---|
| 114,342 | Richards | May 2, 1871 |
| 158,360 | Campbell | Jan. 5, 1875 |
| 195,039 | Owens | Sept. 11, 1877 |
| 281,082 | Kershaw | July 10, 1883 |
| 918,962 | Cauchemont | Apr. 20, 1909 |
| 1,295,813 | Sylvan | Feb. 25, 1919 |
| 1,784,783 | Cauchemont | Dec. 9, 1930 |
| 2,120,605 | Ford et al. | June 14, 1938 |
| 2,269,428 | Breidert | Jan. 13, 1942 |
| 2,295,669 | Laws | Sept. 15, 1942 |
| 2,396,746 | O'Day | Mar. 19, 1946 |
| 2,526,079 | McCahan | Oct. 17, 1950 |

FOREIGN PATENTS

| Number | Country | Date |
|---|---|---|
| 4,541 | Great Britain | Dec. 1, 1877 |
| 6,178 | Great Britain | of 1884 |
| 13,497 | Great Britain | of 1884 |
| 3,062 | Great Britain | Mar. 9, 1885 |
| 12,056 | Great Britain | Oct. 10, 1885 |
| 19,537 | Great Britain | of 1890 |
| 13,257 | Great Britain | of 1898 |
| 2,926 | Great Britain | of 1913 |
| 613,853 | France | Sept. 6, 1926 |
| 38,236 | France | Jan. 27, 1931 |
| 790,979 | France | Sept. 16, 1935 |
| 20,064 | Australia | Nov. 8, 1934 |